United States Patent
Lobbett et al.

(10) Patent No.: US 6,201,622 B1
(45) Date of Patent: Mar. 13, 2001

(54) OPTICAL NETWORK

(75) Inventors: Roy Andrew Lobbett, Ipswich; David Brian Payne, Woodbridge; Sandrew Robert John Cook, Clacton-on-Sea, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/913,713
(22) PCT Filed: Mar. 22, 1996
(86) PCT No.: PCT/GB96/00702
  § 371 Date: Sep. 18, 1997
  § 102(e) Date: Sep. 18, 1997
(87) PCT Pub. No.: WO96/31023
  PCT Pub. Date: Oct. 3, 1996

(30) Foreign Application Priority Data

Mar. 24, 1995 (EP) .................................. 95302000

(51) Int. Cl.[7] .......................... H04B 10/02; H04B 10/00; H04J 14/08
(52) U.S. Cl. .................. 359/177; 359/177; 359/137; 359/139; 359/160
(58) Field of Search ................... 359/160, 176, 359/178, 174, 135, 136, 138, 139, 161, 177, 137

(56) References Cited

U.S. PATENT DOCUMENTS

| | | | |
|---|---|---|---|
| 5,500,908 | * | 3/1996 | Liedenbaum et al. .......... 385/5 |
| 5,574,589 | * | 11/1996 | Feuer et al. .................. 359/160 |

FOREIGN PATENT DOCUMENTS

| | | | | |
|---|---|---|---|---|
| 0 506 163 A1 | * | 9/1992 | (GB) | H04B/10/16 |
| 0 507 367 A1 | * | 10/1992 | (GB) | H04B/10/16 |
| 0 555 063 A2 | * | 8/1993 | (GB) | H04B/10/18 |

* cited by examiner

*Primary Examiner*—Jason Chan
*Assistant Examiner*—M. R. Sedighian
(74) *Attorney, Agent, or Firm*—Nixon & Vanderhye P.C.

(57) ABSTRACT

A gated optical amplifier for a PON includes an input for receiving an optical signal to be amplified, an output for outputting and amplified optical signal, an optical amplifier device for amplifying an optical input thereto, a detector, and an optical switch for allowing the amplified optical signal to leave the output upon the detector detecting the presence of an optical signal of a predetermined magnitude.

18 Claims, 2 Drawing Sheets

OPTICAL NETWORK

BACKGROUND OF THE INVENTION

1. Field of the Invention

This invention relates to an optical network component, and in particular to an optical network comprising one or more of such components.

2. Related Art

Currently, in the United Kingdom, the telecommunications network includes a trunk network which is substantially completely constituted by optical fibre, and a local access network which is substantially completely constituted by copper pairs. In future, it would be highly desirable to have a fixed, resilient, transparent telecommunications infrastructure all the way to customer premises, with capacity for all foreseeable service requirements. One way of achieving this would be to create a fully-managed fibre network for the whole access topography. Preferably, such a topography should comprise passive optical networks (PONs) which incorporate single mode optical fibre and no bandwidth-limiting active electronics.

In a PON, a single fibre is fed out from a head-end (exchange), and is fanned out via passive optical splitters at cabinets and distribution points (DPs) to optical network units (ONUs). The ONUs can be in customers' premises, or in the street serving a number of customers. The use of optical splitters enables sharing of the feeder fibre and the exchange-based optical line termination (OLT) equipment, thereby giving PONs cost advantages. At present, simplex deployment of PONs is the preferred option, that is to say separate upstream and downstream PONs are provided whereby each customer has two fibres. A downstream PON (that is to say a PON in which traffic is transmitted by the head-end for reception by the customers) uses passive optical splitters to feed the ONUs. Similarly, an upstream PON (that is to say a PON in which traffic is transmitted to the head-end by the customers) uses passive optical combiners to combine the customer traffic for reception by the head-end. In practice, the splitters and combiners are identical in structure. Although simplex working increases the complexity of the infrastructure due to the two fibres per circuit required, it benefits from a low optical insertion loss (owing to the absence of duplexing couplers), and a low return loss, since such systems are insensitive to reflections of less than 25 dBm with separate transmit and receive paths. Typically, a PON has a four-way split followed by an eight-way split, so that a single head-end fibre can serve up to 32 customers.

In a known arrangement—TPON (telephony over a passive optical network)—a head-end station broadcasts time division multiplex (TDM) frames to all the terminations on the network. The transmitted frames include both traffic data and control data. Each termination recognises and responds to appropriately-addressed portions of the data in the broadcast frames, and ignores the remainder of the frames. In the upstream direction, each termination transmits data in a predetermined timeslot, and the data from the different terminations are assembled at the head-end into a time division multiple access (TDMA) frame of predetermined format.

The present applicant has developed a bit transport system (BTS) for use in a PON which operates using TDMA. The BTS is described in our European patent specifications 318331, 318332, 318333 and 318335.

Recently, the PON principle has been expanded to form what is known as the SuperPON concept, in which high power optical amplifiers are used to allow very large, high split PONs to be built. For example, the use of optical amplifiers (such as fibre amplifiers) permits up to 3500 customers to be connected to a single head-end station over distances of up to 200 km.

Unfortunately, until now, optical amplifiers have only been used on downstream SuperPONs, as the use of amplifiers on an upstream SuperPON would cause noise problems resulting from the superposition of amplified stimulated emissions (ASEs) from the amplifiers.

An example of an optical communications network for broadcasting television signals and also for providing bidirectional voice and data communications is disclosed in European patent application 0 499 065. Optical amplifiers are provided in both the upstream and downstream directions. Anoptical fibre telecommunications line which has one or more gated optical amplifiers is disclosed in European patent application 0 506 163. The gated optical amplifiers are operable to produce substantially no output if their input is below a predetermined threshold. In this way, on the line being broken upstream of the amplifier, the amplifier produces substantially no output causing the link to shut down and thereby preventing light escaping from the broken fibre from injuring maintenance personnel.

SUMMARY OF THE INVENTION

According to a first aspect of the present invention, there is provided an optical network component comprising:
  a combiner;
  a plurality of optical fibres for connecting the combiner to network elements downstream thereof;
  an optical fibre for connecting the combiner to the network elements upstream thereof; and
  characterised in that said plurality of optical fibres have respective gated amplifiers positioned therein, each optical amplifier being operable selectively to amplify a signal being sent in the upstream direction so as to provide an amplified output signal on receiving a desired input signal and to provide substantially no output signal otherwise.

It is to be understood that the combiner and amplifiers may be integrated into a single article of manufacture or may be located, for example, in different buildings from one another. The meaning of the word 'component' is intended to encompass both these possibilities.

In some embodiments of the invention, the gated optical amplifier comprises:
  an input for receiving an optical signal to be amplified;
  an output for outputting an amplified optical signal;
  an optical amplifier device for amplifying an optical signal input thereto;
  a detector; and
  an optical switch for allowing the amplified optical signal to leave the output upon the detector detecting the presence of an optical signal exceeding a predetermined magnitude.

Advantageously, the optical amplifier device and the optical switch may be positioned along an optical fibre leading from the input to the output. The optical switch may be positioned at the output side of the optical amplifier device.

Preferably, the amplifier further comprises an optical tap for tapping off part of an optical signal during its passage from the input to the output, the tapped-off part being input to the detector. The optical tap may be positioned at the input side of the optical amplifier device, between the optical amplifier device and the optical switch, or part-way along the optical amplifier device.

The amplifier may further comprise delay means positioned at the output side of the optical amplifier device. Preferably, the delay means comprises an adjustable electrical delay means.

Advantageously, the optical tap may be a fused fibre coupler, and such as to tap off substantially 10% of said optical signal to the detector, and to pass the untapped part of said optical signal to the optical switch.

The optical amplifier device may be a fibre amplifier or a semiconductor laser amplifier (SLA). If the optical amplifier device is an SLA, the SLA may also constitute the optical switch. Otherwise, the optical switch may be an electro-absorption modulator (EAM) or similar type of optical switch.

Alternatively, the optical switch is a non-linear optical switch whose switching threshold is set to allow the amplified optical signal to pass therethrough, the non-linear optical switch also constituting the detector. Preferably, the non-linear optical switch is a saturable absorber such as multiple quantum well (MQW) device or a non-linear fibre loop mirror.

According to a second aspect of the present invention there is provided an optical network comprising one or more components according to the first aspect of the present invention.

As each of the gated amplifiers is such that it is only turned on when it is required to amplify a signal being transmitted upstream along its associated fibre, and as upstream transmissions on the PON are typically such that each customer terminal transmits data in a predetermined time'slot, the data from the different customer terminals being assembled at the head-end station into a TDM frame of predetermined format, only one of the amplifiers, at any given time, will be required to amplify a signal from one of its downstream customer terminals. Consequently, this upstream PON does not suffer from noise problems resulting from the superposition of ASEs from the amplifiers.

Advantageously, each of the plurality of fibres may be connected to a further passive optical combiner via a respective further optical fibre. In larger networks, each of the respective further optical fibres is connected to yet another optical combiner, each of which is connected to a plurality of customer terminals.

According to a third aspect of the present invention there is provided a method of operating an optical telecommunications network comprising the step of:

combining a plurality of optical inputs carried by respective optical fibres into a single optical output carried by a single optical fibre; and characterised by the step of:

selectively amplifying, at any one time, only those optical inputs in which a desired signal is detected.

BRIEF DESCRIPTION OF THE DRAWINGS

Specific embodiments of the invention will now be described, by way of example, with reference to the accompanying drawings, in which.

DETAILED DESCRIPTION OF EXEMPLARY EMBODIMENTS

Figure 1:
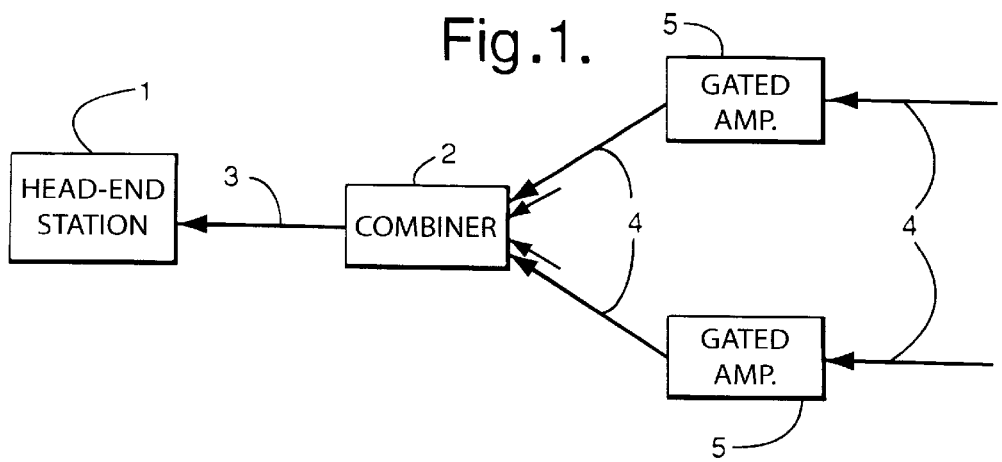
FIG. 1 is a schematic representation of part of a Super-PON.

Referring to the drawings, FIG. 1 shows a head-end station 1 of an upstream SuperPON, the head-end station being connected to a combiner 2 by an optical fibre 3. The combiner 2 is fed by four fibres 4 (only two of which are shown in full), each of which leads to 144 customer ONUs (not shown) via further combiners (not shown). A respective gated amplifier 5 is provided in each of the fibres 4.

Each of the gated amplifiers 5 is such that it is only turned on when it is required to amplify a signal being transmitted upstream along its associated fibre 4. As upstream transmissions on the SuperPON are such that each ONU transmits data in a predetermined time slot, and the data from the different ONUs are assembled at the head-end station 1 into a TDM frame of predetermined format, only one of the amplifiers 5 at any given time will be required to amplify a signal from one of its downstream ONUs. Consequently, the upstream SuperPON described above does not suffer from noise problems resulting from the superposition of ASEs from the amplifiers.

Figure 2:
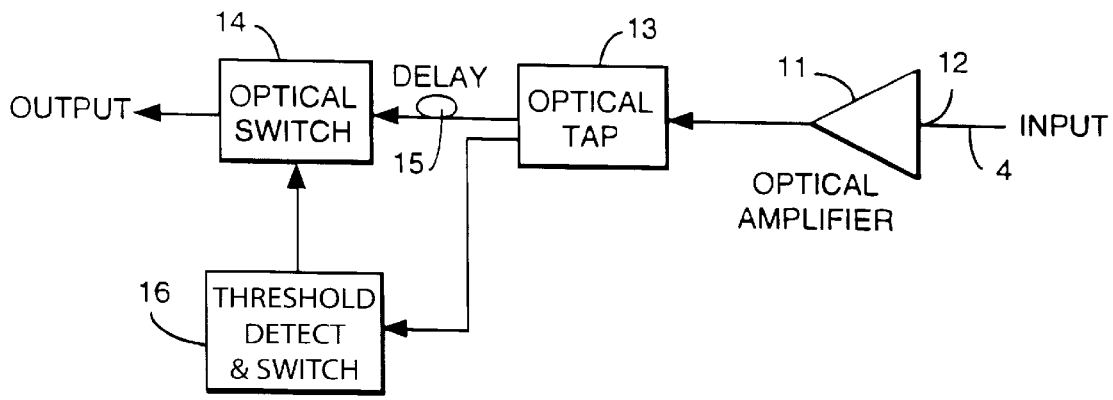
FIGS. 2–6 are schematic representations of gated amplifiers, each of which is constructed in accordance with the invention, for use in the SuperPON of FIG. 1.

FIG. 2 shows a first form of gated amplifier 5, the gated amplifier including an optical amplifier 11, which receives upstream transmissions along the associated fibre 4 at an input 12. The output of the optical amplifier 11 leads to an optical tap 13, whose output is fed to an optical switch 14 via a delay member 15. The optical switch 14 is controlled by a threshold detector 16, which receives the tapped off optical signal from the optical tap 13.

The optical amplifier 11 is an erbium doped fibre amplifier, and the optical switch 14 is an electro-absorption modulator (EAM). The optical tap 13 is a 90/10 fused fibre coupler, arranged so that 90% of the signal is output to the optical switch 14 and 10% to the detector 16. The delay member 15 comprises an electrical cable to provide a coarsely predetermined delay and an electrical circuit to provide an additional finely adjustable delay. Alternatively, the delay member may comprise a length of optical fibre. The threshold detector 16 a PINFET receiver.

In use, the signal being transmitted upstream along the fibre 4 is amplified by the optical amplifier 11. 10% of the amplified signal is tapped off to the threshold detector 16 by the optical tap 13, the remaining 90% of the amplified signal being passed to the optical switch 14 via the delay member 15. The threshold detector 16 is such as to produce an output to turn on the optical switch 14 when it detects an input signal above a predetermined level. This level is chosen such that the switch 14 is gated only when the fibre 4 carries an upstream signal, so that the switch is not turned on in response to noise carried by the fibre 4 and amplified by the amplifier 11. The length of the optical fibre constituting the delay member 15 is chosen to synchronise the arrival of the main part of the optical signal at the switch 14 with the gating signal from the detector 16. Typically, the length of the delay fibre 15 is of the order of a few metres. Additionally, fine or coarse delay adjustment means may be present in the control path between the optical tap 13 and the optical switch 14.

It is, of course, necessary to turn the switch 14 off, once the upstream signal carried by the associated fibre 4 has been passed—otherwise, the amplifier 11 would remain active, which could result in problems at the head-end station 1, caused by the amplification of noise. Closing the optical switch 14 at the end of data transmission could be timed by using a monostable or by counting bit periods or by looking for unique data transitions or sequences to indicate the end of the data. For example, a monostable could be set to a fixed delay which is dependent upon the packet length of the data being transmitted. Where ATM cells are being transmitted, the monostable would be set up to pass a signal which has a length of 424 bits (that is to say the number of bits—8× 53—in an ATM cell). The period of the monostable could be tuned with external capacitance and resistance to give a time period equivalent to the length of the data burst. However, the capacitance and resistance values are not sufficiently precise to define an accurate period. Hence, a dead period would be required to ensure that data bursts are not cut short. Alternatively, a counter can be used, the counter being set to the number of bits in a data burst (424 for ATM cells). The counter would be clocked at the data rate (or by a free-running clock), and would be started on detection of the start of the data burst. After the counter had counted down to zero, it would be is re-set and the optical switch 14 would be closed. This approach allows precise gating of the switch 14. A further alternative would be to put a flag in the customer transmissions—say, sixteen "O"s at the end of each transmission—to indicate the end of that transmission.

It will be apparent that the gated amplifier described above could be modified in a number of ways. For example, the erbium doped fibre amplifier 11 could be replaced by a semiconductor laser amplifier (SLA), and the electro-absorption modulator constituting the switch 14 could be replaced by a Mach Zehnder device, a lithium niobate switch, or any other optical switch which meets the system requirements.

Figure 3:
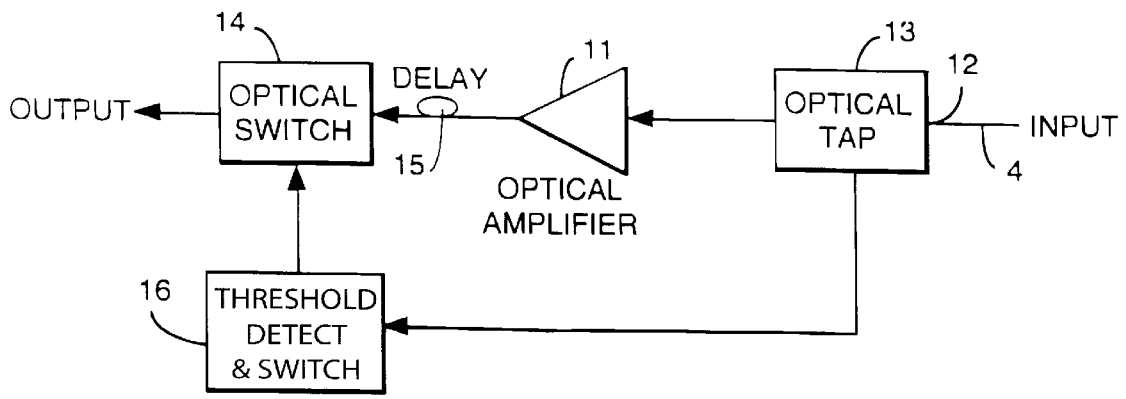

FIG. 3 shows a modified arrangement of the components of the gated amplifier of FIG. 2. As the gated amplifier of FIG. 3 uses basically the same components as the amplifier of FIG. 2, like reference numerals will be used for like parts, and only the modifications will be described in detail. Thus, the optical tap 13 of the FIG. 3 embodiment is positioned at the input of the optical amplifier 11. Apart from tapping the incoming optical signal at the input of the amplifier 11, the gated amplifier of FIG. 3 operates in exactly the same way as that of FIG. 2. Similarly, modifications to the components of FIG. 3 could be made in a similar manner to those in which the components of FIG. 2 could be modified.

Figure 4:
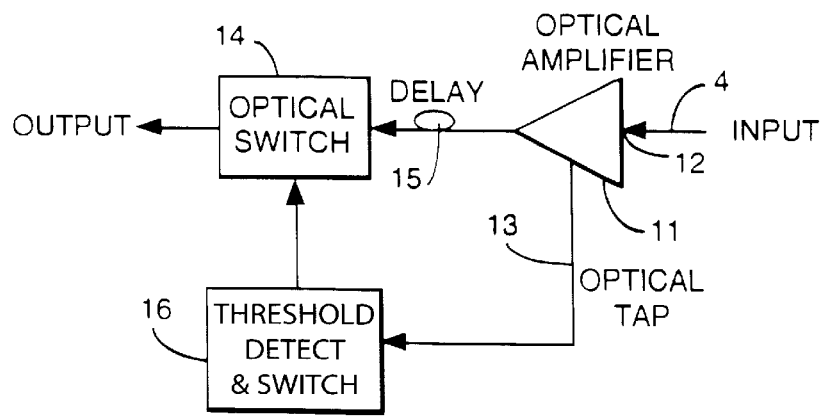

FIG. 4 shows a further modification of the amplifier of FIG. 2 and, again, like reference numerals will be used for like parts. The only difference between this embodiment and that of FIG. 2, is that the optical tap 13 is positioned part way along the optical amplifier 11. Here again, the same options for modification of components apply as for the two earlier embodiments.

Figure 5:
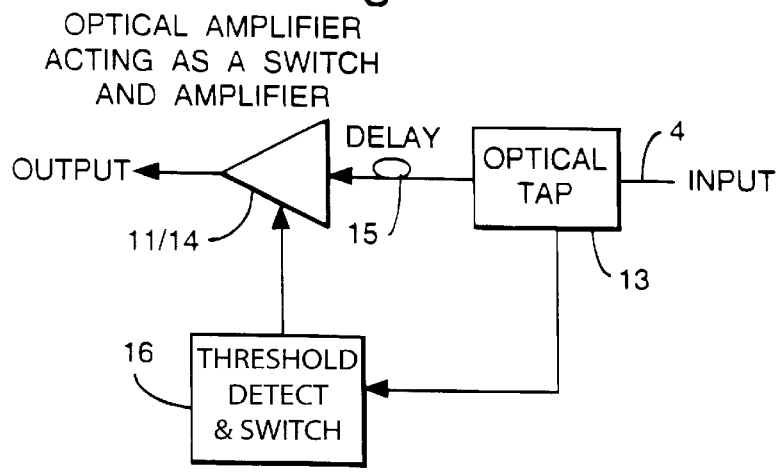
Figure 6:
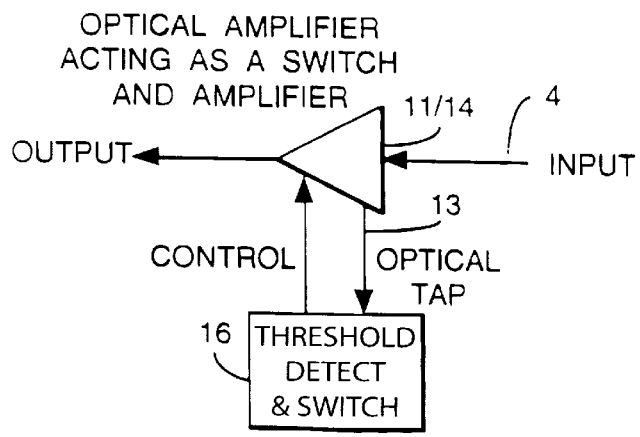

In the modification of FIG. 5, the optical tap 13 and delay member 15 are placed at the input of the optical amplifier 11. Preferably, the optical amplifier 11 is an SLA, which can act as both a switch and an amplifier. In this case, there is no need for a separate optical switch, and the output of the detector 16 is used to control the operation of the amplifier 11. In this embodiment, the use of an SLA is preferred, as it operates quicker than a fibre amplifier. However, in applications where switching speed is not crucial, it would be possible to use a fibre amplifier, in which case the output of the detector would be used to control the pump laser of the fibre amplifier. Here again, similar options for modification of the components apply as for the earlier embodiments. FIG. 6 shows a further modification to the embodiment of FIG. 5. Here again, therefore, the optical amplifier 11 acts as both a switch and an amplifier, but the optical tap 13, which leads to the detector 16, is taken from part-way along the amplifier. As with the embodiment of FIG. 5, the amplifier 11 is preferably an SLA, but it would also be possible to use a fibre amplifier.

In another modification (not shown), a non-linear optical switch could be used to fulfill the functions of the optical switch 14 and the threshold detector 16. For example, a non-linear optical fibre loop mirror could be positioned at the output of the optical amplifier 11. The loop mirror could have either an asymmetric coupler and a simple fibre loop, or a symmetric coupler with an amplifier in the fibre loop. In either case, the loop mirror exhibits different non-linear properties in the two directions of propagation, so that it acts as a switch, having low transmission for low intensity noise components and high transmission for data pulses. The advantage of this approach is that the threshold detector is in effect built into the optical switch, the threshold being the transition point from low transmission to high transmission. Consequently, this type of switch results in automatic synchronisation of switching. If the fibre loop mirror includes an amplifier, this can be either a fibre amplifier, or a semiconductor amplifier. Other types of non-linear switch such as a saturable absorber—e.g. a multiple quantum well (MQW) device—could also be used.

It will be realised by those skilled in the art that the number of ONUS that can be connected via the network to a head-end fibre without unacceptably degrading the quality of transmission is dependent on the bit-rate used in the

What is claimed is:

1. A method of operating an optical telecommunications network having a combiner, a headend disposed upstream of said combiner, a plurality of network elements disposed downstream of said combiner, a first optical fibre for connecting said combiner to said headend upstream thereof, a plurality of second optical fibres for connecting said combiner to said network elements downstream thereof, said method including the steps of:

transmitting from each of at least two network elements a respective upstream signal in a respective predetermined time slot along one of said second optical fibres and said first optical fibres to said headend via said combiner;

operating a gated optical amplifier in series with each said second optical fibre to amplify, selectively and optically, an upstream signal travelling along an associated upstream optical fibre so as to provide an amplified upstream output signal on receiving a desired input optical signal and to provide substantially no output signal otherwise;

combining upstream signals from the gated optical amplifiers and transmitting the combined signal along said upstream optical fibre; and assembling upstream signals arriving at said headend into a time division multiplexed frame having a predetermined format.

2. An optical network component including:

a combiner;

a headend disposed upstream of said combiner;

a plurality of network elements disposed downstream of said combiner;

a first optical fibre for connecting said combiner to said headend upstream thereof;

a plurality of second optical fibres for connecting said combiner to said network elements downstream thereof;

wherein each of at least two of said network elements includes a respective transmitter which each transmit a respective upstream signal in a respective predetermined time slot along one of said second optical fibres and said first optical fibre to said headend via said combiner;

said headend including means for assembling each of said upstream signals arriving at said headened into a time division multiplexed frame having a predetermined format; and said plurality of second optical fibres having respective gated optical amplifiers positioned therealong, each optical amplifier being gated to selectively amplify a signal being sent in the upstream direction so as to provide an amplified output signal on receiving a desired input signal and to provide substantially no output signal otherwise, and wherein said gated optical amplifier comprises:
an input for receiving an optical signal to be amplified;
an output for outputting an amplified optical signal;
an optical amplifier device for amplifying an optical signal input thereon;
a detector; and
an optical switch for allowing the amplified optical signal to leave the output upon the detector detecting the presence of an optical signal exceeding a predetermined magnitude.

3. An optical network component as claimed in claim 2, wherein the optical switch is positioned at the output side of the optical amplifier device.

4. An optical network component as claimed in claim 2, further comprising an optical tap for tapping off part of an optical signal during its passage from the input to the output, the tapped-off part being input to the detector.

5. An optical network component as claimed in claim 4, wherein the optical tap is positioned at the input side of the optical amplifier device.

6. An optical network component as claimed in claim 4, wherein the optical tap is positioned between the optical amplifier device and the optical switch.

7. An optical network component as claimed in claim 4, wherein the optical tap is positioned part-way along the optical amplifier device.

8. An optical network component as claimed in claim 5, further comprising delay means positioned at the input side of the optical switch.

9. An optical network component as claimed in claim 8, wherein delay means comprises an adjustable electrical delay means.

10. An optical network component as claimed in claim 4, wherein the optical tap is a fused fibre coupler.

11. An optical network component according to claim 2, wherein said gated optical amplifier comprises:
an input for receiving an optical signal to be amplified;
an output for outputting an amplified optical signal;
a semiconductor laser amplifier for amplifying an optical signal input thereto; and
a detector for providing a signal indicative of whether said input signal is a desired signal or noise;
wherein said semiconductor laser amplifier is responsive to said detector signal so as to provide an amplified output signal on receiving a desired input signal and to provide substantially no output on receiving the input noise.

12. An optical network component according to claim 2, wherein said gated optical amplifier comprises:
an input for receiving an optical signal to be amplified;
an output for outputting an amplified optical signal;
an optical amplifier device for amplifying an optical signal input thereto; and
a non-linear optical switch whose switching threshold is set to allow an amplified desired optical signal to pass through and to prevent an amplified noise signal from passing through.

13. An optical network component as claimed in claim 12, wherein the non-linear optical switch comprises a saturable absorber.

14. An optical network component according to claim 13, wherein said saturable absorber comprises a multiple quantum well (MQW) device.

15. An optical network component according to claim 13, wherein said saturable absorber comprises a non-linear fibre loop mirror.

16. An optical network component including:
a combiner;
a headend disposed upstream of said combiner;
a plurality of network elements disposed downstream of said combiner;
a first optical fibre for connecting said combiner to said headend upstream thereof;
a plurality of second optical fibres for connecting said combiner to said network elements downstream thereof;
wherein each of at least two of said network elements includes a respective transmitter which each transmit a respective upstream signal in a respective predetermined time slot along one of said second optical fibres and said first optical fibre to said headend via said combiner;
said headend including means for assembling each of said upstream signals arriving at said headend into a time division multiplexed frame having a predetermined format; and
said plurality of second optical fibres having respective gated optical amplifiers positioned therealong, each optical amplifier being gated to selectively amplify a signal being sent in the upstream direction so as to provide an amplified output signal on receiving a desired input signal and to provide substantially no output signal otherwise.

17. An optical network comprising one or more components according to claim 16.

18. An optical network according to claim 17 further comprising a head-end receiver station and a plurality of customer terminals.

* * * * *